Figure 1:
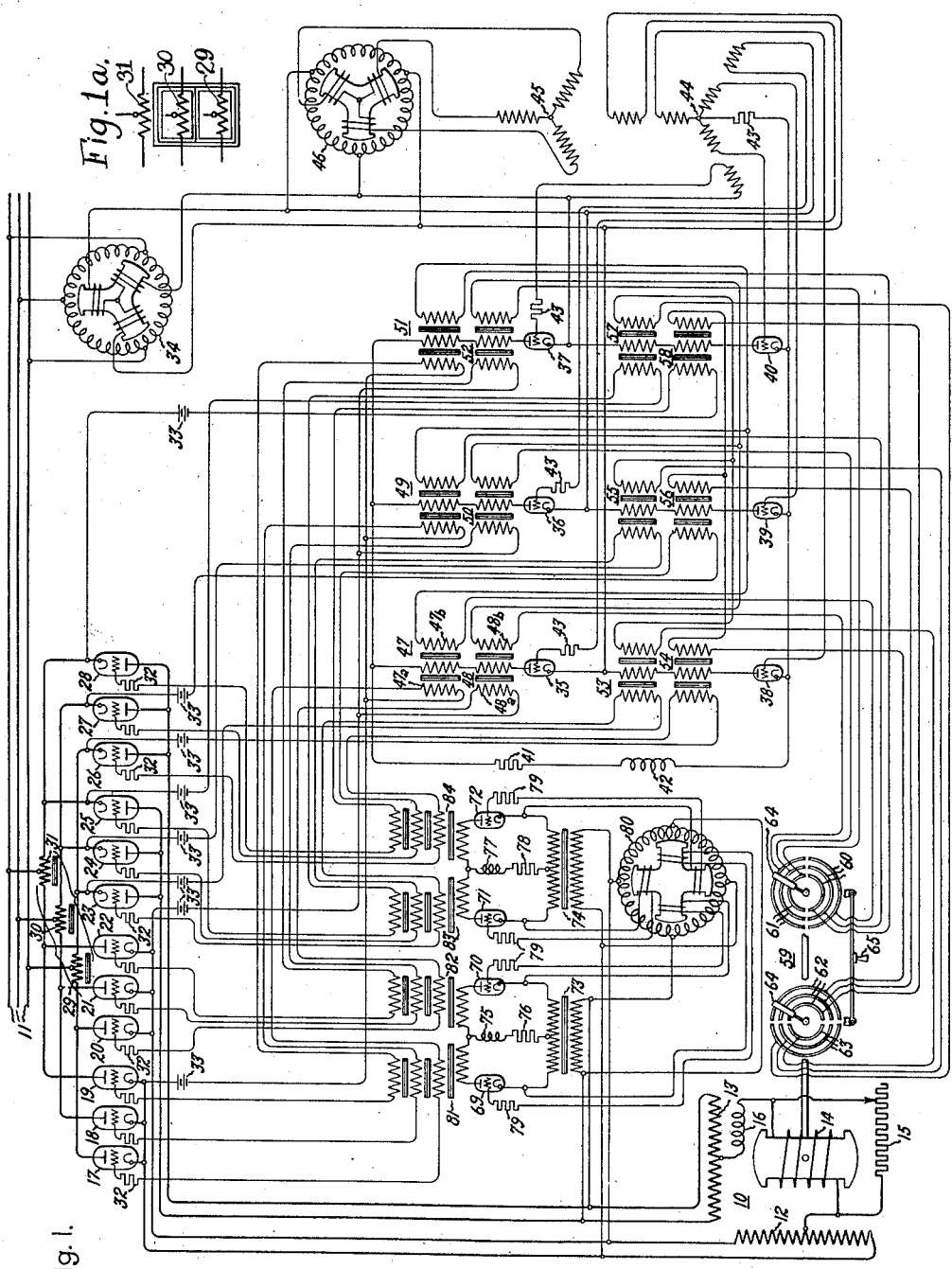

Oct. 9, 1934.                    C. A. SABBAH                    1,976,463
        ELECTRIC VALVE CONVERTING SYSTEM AND EXCITATION APPARATUS THEREFOR
                    Filed Aug. 2, 1933            2 Sheets-Sheet 1

Inventor:
Camil A. Sabbah,
by  Harry E. Dunham
His Attorney.

Oct. 9, 1934.  C. A. SABBAH  1,976,463
ELECTRIC VALVE CONVERTING SYSTEM AND EXCITATION APPARATUS THEREFOR
Filed Aug. 2, 1933   2 Sheets-Sheet 2

Inventor:
Camil A. Sabbah,
by Harry E. Dunham
His Attorney.

Patented Oct. 9, 1934

1,976,463

UNITED STATES PATENT OFFICE 1,976,463

ELECTRIC VALVE CONVERTING SYSTEM AND EXCITATION APPARATUS THEREFOR

Camil A. Sabbah, Schenectady, N. Y., assignor to General Electric Company, a corporation of New York Application August 2, 1933, Serial No. 683,340

11 Claims. (Cl. 172—120)

My invention relates to improved electric valve converting systems and more particularly to new and improved apparatus for exciting the control elements of the electric valves of such systems.

There have heretofore been proposed numerous electric valve converting systems for transmitting energy from an alternating-current supply circuit to an independent alternating-current load circuit; that is, a load circuit asynchronous with respect to the supply circuit. In many of the electric valve frequency changing systems of the prior art a plurality of valves, or groups of valves, interconnect the several terminals of a supply circuit with each of the terminals of a load circuit and the electric valves are rendered conductive in a predetermined sequence, to supply current to their respective terminals of the load circuit, by means of a distributor mechanism driven at a speed corresponding to the frequency at which it is desired to energize the load circuit. In case the load circuit comprises an alternating-current motor, the distributor mechanism may conveniently be driven by the motor. Such a distributor mechanism has been found to operate satisfactorily at relatively low speeds, but at higher speeds, corresponding to higher frequencies on the load circuit, the well-known disadvantages of rotating distributors or commutators become a serious problem. On the other hand, in certain electric valve frequency changing systems of the prior art, the current has been transferred between the valves, or groups of valves, at the frequency of the load circuit by supplying to the control elements of the electric valves a component of potential of the frequency of the load circuit. Under starting conditions however the counter-electromotive force of the load circuit may be zero or a negligible value, so that a control potential of this frequency cannot be derived from the load circuit.

It is an object of my invention therefore to provide an improved electric valve converting system and an excitation apparatus therefor which will overcome the above-mentioned disadvantages of the arrangements of the prior art and which will be simple and reliable in operation.

It is another object of my invention to provide an improved excitation apparatus for an electric valve converting system which will combine the advantages of a distributor mechanism with those obtained by exciting the control elements of the valves from the load circuit of the system and which will at the same time eliminate the disadvantages inherent in each.

It is a further object of my invention to provide an improved electric valve converting system and an excitation apparatus therefor, which will utilize a distributor mechanism for controlling the several electric valves at the load frequency for relatively low values of frequency on the alternating-current load circuit, but which will use a component of control potential derived from the load circuit for higher values of frequency on the alternating-current load circuit.

It is a further object of my invention to provide an improved excitation apparatus for an electric valve converting system which will provide the control elements of the valves with control potentials of improved wave form to control more accurately the conductivity of the several electric valves.

In accordance with my invention, the several terminals of a load circuit, such for example as a polyphase alternating-current motor, are interconnected with a supply circuit through a plurality of electric valves. Each of the electric valves is provided with a control circuit including two components of periodic control potential, one of the frequency of the supply circuit and one of the frequency of the load circuit. Apparatus is provided for converting these periodic potentials into potentials of rectangular wave form, as for example by deriving the control potentials from a rectifier having an inductive load circuit. Under low frequency conditions on the load circuit, as for example corresponding to a starting of the motor, the magnitude of the component of alternating potential of low frequency will be zero or a very low value. To provide adequate control under these conditions therefore there is provided a distributor mechanism connected to short circuit successively the sources of control potential of the supply frequency in the several control circuits and thus remove the excitation successively from the several electric valves. The distributor mechanism is so arranged that it becomes ineffective when its speed increases beyond a predetermined value, as for example, by arranging its brushes to be disengaged by centrifugal force. At this predetermined speed however the counter-electromotive force of the load circuit will have increased to such a value that it is effective to transfer the current between the valves connected to the several terminals of the load circuit.

Figure 2:
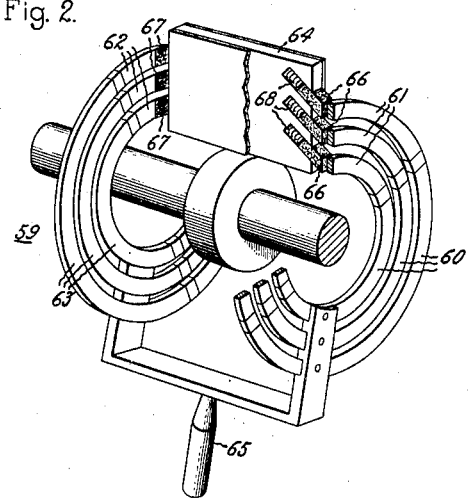
Figure 3:
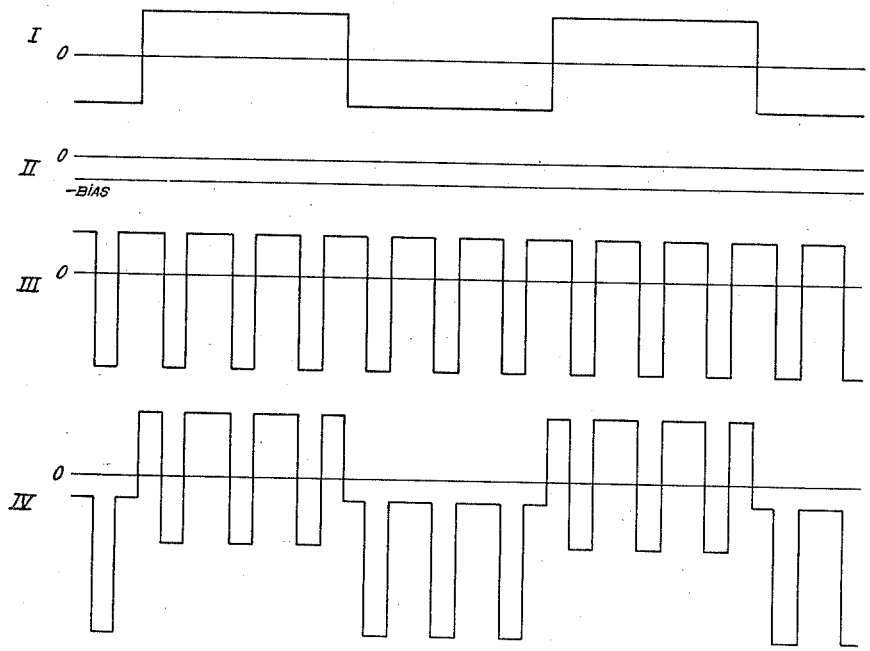

For a better understanding of my invention, together with other and further objects thereof, reference is had to the following description taken in connection with the accompanying drawings, and its scope will be pointed out in the appended claims. Fig. 1 of the accompanying drawings diagrammatically illustrates an electric valve converting system embodying my invention for transmitting energy from a three-phase alternating-current supply circuit to a quarter-phase two-pole alternating-current motor; Fig. 1a shows a transformer used in the system shown in Fig. 1; Fig. 2 illustrates a fragmentary detail of my improved distributor mechanism; while Fig. 3 shows certain electrical operating characteristics of the system shown in Fig. 1.

Referring now more particularly to Fig. 1 of the drawings, there is illustrated an arrangement for operating at variable speed a quarter-phase two-pole motor 10 from a three-phase alternating-current supply circuit 11. The motor 10 may be of any of the several types well known in the art, although I have illustrated by way of example a motor of the synchronous type comprising the phase windings 12 and 13, and a rotatable field winding 14. The field winding 14 may be connected in series with the armature windings, as illustrated, in case it is desired to give the motor series characteristics, or in case shunt characteristics are desired, the field winding may be separately excited in any well-known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed-torque characteristics of the motor, in which case it is preferable also to include a reactor 16 in series with the parallel connected winding 14 and resistor 15.

The terminals of the armature phase winding 12 are connected to the several phases of the supply circuit through two groups of similarly connected electric valves 17—18—19 and 20—21—22 respectively. Similarly, the armature phase winding 13 is connected to the supply circuit 11 through two groups of electric valves 23—24—25 and 26—27—28, connected to the circuit 11 with a polarity opposite to that of electric valves 17–22 inclusive. Each of the electric valves 17–28 inclusive is provided with an anode, a cathode, and a control element, or grid, and may be of any of the several types well known in the art, although I prefer to use valves of the vapor or gaseous electric discharge type. The valves 17 and 20 of their respective groups are interconnected with the valves 23 and 26 of their respective groups, through opposite halves of an inductive winding 29. Similarly, the other valves of the several groups are interconnected through opposite portions of the inductive windings 30 and 31. The inductive windings 29, 30, and 31 are preferably included on a three-phase magnetic core structure, indicated diagrammatically by the braces, and also shown diagrammatically in Fig. 1a, in order to extend the conductive periods of the several electric valves, as explained more fully hereinafter.

In order to render the several electric valves conductive in a predetermined sequence, the control element, or grid, of each of the valves is connected to its respective cathode through a control circuit including a current-limiting resistor 32, a negative bias battery 33, and two sources of control potential, one of the frequency of the supply circuit 11, and one of the frequency of the armature circuit of the motor 10. The components of control potential of the frequency of the supply circuit are supplied from an auxiliary rectifier circuit energized from the alternating-current supply circuit 11 through a rotary phase shifting transformer 34 and comprising the two groups of electric valves 35—36—37 and 38—39—40, connected in a conventional manner to secure full-wave rectification. The direct-current load circuit of this auxiliary rectifier comprises a resistor 41 connected in series with a reactor 42, although in certain instances the resistor 41 may be omitted. The electric valves 35–40 inclusive, are each provided with an anode and a cathode, and are also preferably of the vapor-electric discharge type. These valves may comprise simple two-electrode rectifier valves or may be provided also with control elements, or grids, as illustrated, in which case the grids are connected to their respective cathodes through current-limiting resistors 43 and appropriate phase windings of a secondary network 44 of a grid transformer, the primary network 45 of which is connected to the supply circuit of the rectifier through any suitable phase-adjusting means, such as a rotary phase-shifting transformer 46. In series with the electric valve 35 are connected primary windings of series transformers 47 and 48, the secondary windings 47a and 48a being connected in the control circuits of the electric valves 17 and 20 respectively. The connections of this auxiliary rectifier are such that the current of the particular auxiliary electric valve 35, as adjusted by means of the rotary phase-shifting transformer 34, is of a proper phase relation to apply a high-frequency control potential to the grids of the valves 17 and 20 to render these valves conductive during the desired portion of the cycles of high-frequency supply potential, as will be explained more fully hereinafter. Similarly, in series with the electric valves 36–40 inclusive, are connected the several pairs of current transformers 49—50, 51—52, 53—54, 55—56, and 57—58, respectively, each provided with a secondary winding connected in a control circuit of that electric valve of the group 17–28 inclusive, carrying current of a corresponding phase relation.

It will be noted that the series transformers 47 and 48 are provided with tertiary windings 47b and 48b respectively. Corresponding terminals of these tertiary windings 47b and 48b are connected to one of the segments of the groups of stationary contact segments 60, 61, respectively, of a distributor mechanism 59. Similarly, the other current transformers 49—58 inclusive, are provided with tertiary windings, one terminal of each of which is connected to one of the segments of the groups of segments 60–63 inclusive, of the distributor mechanism 59. The distributor mechanism 59 is provided with a single rotating contact, or brush, assembly 64 which is arranged to interconnect the stationary contact segments of each of two of the groups 60–64 inclusive, at all times. The tertiary windings of the groups of current transformers 47—49—51, 48—50—52, etc., are connected in star, the other corresponding terminals of each group being interconnected to form an electrical neutral. In this manner it is seen that the current transformers whose tertiary windings are connected to the particular group of segments which are interconnected through the rotating brush assembly 64, are short circuited so that no control potentials of the frequency of the supply circuit 11 are applied to their associated control circuits of the electric valves 17–28 inclusive. A phase-adjusting mechanism 65 may be provided for the stationary groups of contact segments of the distributor 59, if desired.

A fragmentary detail of the distributor mechanism 59 is shown in Fig. 2 of the drawings. From this figure it will be seen that the groups of contact segments 60 and 61 comprise concentric annular rings, and that the groups 60—61 and the groups 62—63 are mounted coaxially with the rotatable brush assembly 64 mounted between them. The brush assembly 64 is provided with a plurality of brush elements 66 and 67 arranged to engage the groups of segments 60—61 and 62—63, respectively. Each of the brush elements 66—67 is arranged in a slot in the brush assembly 64 inclined radially outward, as illustrated, and are given an appropriate brush pressure by means of the biasing springs 68 mounted in the slots. With such an arrangement, at speeds below a predetermined value the springs 68 are effective to force the brush elements 66 and 67 to engage their respective contact segments. At speeds above a predetermined value however the component of centrifugal force acting on the brush elements 66 and 67 along the axes of the slots, is sufficient to overcome the biasing force of the springs 68 and to disengage the brush elements 66 and 67 from the stationary contact segments.

In order to provide a component of control potential of the frequency of the load circuit, there are provided two pairs of auxiliary rectifier valves 69 and 70, and 71 and 72, energized from the terminals of the motor-armature phase windings 13 and 12 respectively, through transformers 73 and 74 respectively. The pairs of valves 69—70 and 71—72 and their associated transformers are connected in a well-known manner to secure half-wave rectification, the unidirectional current circuit of these rectifiers comprising the reactance device 75 and resistor 76, and reactor 77 and resistor 78 respectively, although in certain cases the resistors 76 and 78 may be omitted. The electric valves 69–72 inclusive, are each provided with an anode and a cathode and are also preferably of the vapor-electric discharge type. In addition, they may be provided with control elements, or grids, as illustrated, in which case the control elements are connected to their respective cathodes through current-limiting resistors 79 and control circuits energized from the supply circuit of the auxiliary rectifiers; that is, the armature windings 12 and 13, for example, through any suitable phase-adjusting mechanism such as a rotary phase-shifting transformer 80. In series with the electric valves 69–72 inclusive, are connected primary windings of current transformers 81–84 inclusive, respectively, each provided with three secondary windings, as illustrated, connected in the control circuits of the group of valves supplying current to the particular terminal of the armature windings of the motor 10 corresponding to that from which the particular electric valve of the group 69–72 inclusive, is energized.

The general principles of operation of the above described apparatus for transmitting energy from the alternating-current circuit 11 to the motor 10 will be well understood by those skilled in the art. In brief, it will be assumed that the motor field member 14 and the distributor mechanism 59 are substantially in the positions illustrated. Under these conditions, as will be explained more fully hereinafter, the groups of electric valves 17—18—19 and 23—24—25 will be rendered conductive. These two groups of valves comprise a three-phase full-wave rectifier circuit of which the unidirectional current circuit comprises the lower half of the armature phase winding 12, field winding 14, the reactor 16, and the left-hand portion of the armature phase winding 13.

The resultant motor field set up by current flowing in the armature windings 12 and 13, as just described, is in such a direction as to produce a torque upon the motor field 14 and initiate rotation of the motor which, it will be assumed, is in a clockwise direction. When the motor 10 has rotated through something less than 90 electrical degrees, the rotating brush assembly 64 will be effective to render non-conductive the electric valves 17—18—19 and render conductive the electric valves 20—21—22, as will be explained in detail hereinafter. The result is that current is transferred from the lower half to the upper half of the armature phase winding 12 and the resultant armature magnetomotive force of the motor 10 is advanced 90 electrical degrees and a torque is exerted upon the motor field 14 to rotate it through an additional 90 degrees. In this manner current is successively commutated between the several terminals of the armature phase windings 12 and 13 to produce a rotating armature magnetomotive force and a rotation of the motor 10. The effect of the inductive windings 29—30—31 mounted on a three-phase magnetic core structure is to extend the conductive periods of each of the electric valves 17–28 inclusive, from 120 electrical degrees, as is normal in the case of three-phase converting circuits, to 240 electrical degrees, as referred to the supply circuit 11. This extension of the conductive periods is necessary to establish a proper balance in the magnetomotive forces of the several arms of the three-legged magnetic core structure, as is explained in detail in United States Letters Patent No. 1,907,589, granted May 9, 1933, upon my application.

Under the starting conditions assumed, the counter-electromotive force of the armature windings of the motor 10 is zero or of a very low value, so that the control potentials supplied by the series transformers 81–84 inclusive, in the auxiliary rectifier circuits of the valves 69–72 inclusive, may be neglected. The auxiliary rectifier valves 35–40 inclusive, however, are operating as a three-phase full-wave rectifier supplying current to the load circuit including the resistor 41 and the reactor 42, which is effective to maintain the unidirectional current substantially constant. The currents in the circuits of the several valves thus take the form of pulsating unidirectional currents of rectangular wave form.

The potentials induced in each of the secondary windings of the current transformers 47–58 inclusive, may thus be represented by the curve of Diagram III of Fig. 3, in which the negative portions of the wave are of 120 electrical degrees duration, corresponding to the intervals in which the corresponding auxiliary rectifier valve is conductive, while the positive portions are of 240 electrical degrees, corresponding to the intervals in which the electric valve is non-conductive. Since the areas of the positive and negative portions of this wave must be equal for a pure alternating potential, the amplitude of the positive portions must be exactly half that of the negative portions. The control potentials of this wave form included in the control circuits of the several electric valves super-imposed upon the negative bias of the batteries 33, as represented by Diagram II of Fig. 3, are effective to render conductive each of the several electric valves for 240 electrical degrees of each of the cycles of the supply frequency.

Under the assumed conditions however it will be seen that the rotating brush assembly 64 interconnects the segments of the groups 61 and 62, thus short circuiting the star-connected tertiary windings of the series control transformers 48—50—52 and 54—56—58 respectively. The secondary windings of these transformers are included in the control circuits of the groups of valves 20—21—22 and 26—27—28 with the result that the negative bias batteries in the control circuits of these valves maintain them non-conductive, since the short circuiting of the tertiary windings reduces the control potential of the frequency of the supply circuit 11 to substantially zero. The groups of valves 17—18—19 and 23—24—25 will however be rendered conductive by the potentials of the secondary windings of the groups of transformers 47—49—51 and 53—55—57 respectively. As the distributor mechanism 59 rotates with the motor 10, the tertiary windings of the series control transformers connected in the circuit with the auxiliary rectifier valves 35-40 inclusive, are successively short circuited in a predetermined sequence so that only those groups of valves are rendered conductive which are connected to the armature windings of the motor 10 in a torque-producing position with respect to the motor field 14 at a particular instant. As is well understood by those skilled in the art, the current is commutated between the several groups of valves under starting conditions by the electromotive force of the alternating-current supply circuit 11.

The average voltage impressed upon the armature windings 12 and 13 may be reduced under starting conditions by retarding the phase of the potentials impressed upon the grids of the valves 17-28 inclusive. This may be accomplished by retarding the phase of the potentials impressed upon the anodes of the auxiliary rectifier valves 35-40 inclusive, by means of the rotary phase-shifting transformer 34 or by retarding the phase of the potentials impressed upon the grids of the auxiliary rectifier valves 35-40 inclusive, by means of the rotary phase-shifting transformer 46. It is desirable to have the transformer 46 adjusted to impress potentials on the grids of the valves 35-40 inclusive, substantially in quadrature with the anode potentials of these valves to reduce the energy component in the auxiliary rectifier to a negligible value. In such a case the resistor 42 may be omitted from the auxiliary rectifier circuit. By gradually advancing the phase of the grid potentials by means of the rotary phase-shifting transformers 34 and 46, the average voltage impressed upon the armature windings of the motor 10 may be increased to increase the speed of the motor. Additional speed control may be obtained by adjusting the variable resistor 15 connected in parallel with the field winding 14 or by the phase-adjusting mechanism 65 of the distributor 59. This latter adjustment produces a result similar to that of shifting the brushes of an ordinary direct-current motor.

As the speed of the motor 10 increases, the generated counter-electromotive force increases correspondingly and this electromotive force impressed upon the auxiliary rectifier valves 69-72 inclusive, through the transformers 73 and 74 produces in the series control transformers 81-84 inclusive, alternating potentials having the wave form illustrated in Diagram I of Fig. 3. The rectangular wave form, as in the auxiliary rectifier apparatus operating at the supply frequency, is due to reactors 75 and 77 of the unidirectional current circuits of these auxiliary rectifiers. The control potential impressed upon the grid of each of the several electric valves 17-28 inclusive, is the resultant of the potentials represented by Diagrams I, II, and III of Fig. 3, which is shown in Diagram IV of Fig. 3. Thus it is seen that the negative half cycles of control potential derived from the current transformers 81-84 inclusive, of the frequency of the load circuit, together with the negative bias of the batteries 33, are sufficient to overcome the positive portions of the supply frequency control potential so that positive control potential is periodically removed from the several groups of valves 17—18—19, 20—21—22, etc., at the frequency of the load circuit. Under these latter operating conditions it will be understood that the counter-electromotive force of the motor 10 is effective to commutate the current between the several groups of valves.

Under these conditions, the normal functioning of the distributing apparatus 59 to periodically short circuit or remove the supply frequency component of control potential is no longer needed. However, it is under these very conditions, when the motor has reached a substantial speed, that the distributor mechanism tends to become most troublesome, a well-known characteristic of mechanical distributors and commutators. In the arrangement described above however and illustrated in Fig. 2 of the drawings, when the motor 10 reaches a predetermined speed, the centrifugal force acting upon the brush elements 66 and 67 overcomes the pressure of the biasing springs 68, and the brush elements 66 and 67 slide inwardly into the slots in which they are mounted, disengaging the stationary groups of segments and thus rendering the distributing mechanism ineffective.

The auxiliary rectifying valves 35-40 inclusive, operating at the supply frequency may if desired be of the ordinary two-electrode type. As illustrated however they are of the three-electrode type, in which case their control grids are energized from their supply circuit through a rotary phase-shifting transformer 46 and a grid transformer 44—45. With such an arrangement, the phase of the potentials applied to the grids of these valves may be retarded by approximately 90 degrees with respect to their anode potentials so that the voltage which must be consumed in the load circuit may be reduced to approximately zero; that is, to a value sufficient only to force the current through the internal resistance of the rectifying system. With such an arrangement, the resistance element 41 may be omitted. Similarly, if desired, the auxiliary rectifying valves 69-72 inclusive, operating at the load frequency may be of the two-electrode type or may be provided with auxiliary control electrodes energized through the rotary phase-shifting transformer 80 with a potential substantially in quadrature with the anode potentials of these valves, in which case the resistance elements 76 and 78 may be omitted.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In an electric valve converting system for transmitting energy from an alternating-current supply circuit to an asynchronous alternating-current load circuit, excitation apparatus for the electric valves of the system comprising a control circuit for each of the valves including a source of periodic control potential of the frequency of said supply circuit and a source of periodic control potential of the frequency of said load circuit, and means for converting said periodic potentials into potentials of rectangular wave form, the resultant of said potentials serving to render said valves conductive in a predetermined sequence.

2. In an electric valve converting system for transmitting energy from an alternating-current supply circuit to an asynchronous alternating-current load circuit, excitation apparatus for the electric valves of the system comprising a control circuit for each of the valves including a source of periodic control potential of the frequency of said supply circuit, means for converting said potential into one of rectangular wave form having a positive portion of a duration equal to the portion of each cycle of the supply circuit during which the respective valve is to be made conductive, each of said circuits including also a source of periodic control potential of the frequency of said load circuit, and means for converting said last-mentioned potential into one of rectangular wave form having a positive portion of a duration equal to the portion of each cycle of the load circuit during which the respective valve is to be made conductive.

3. In an electric valve converting system for transmitting energy from an alternating-current supply circuit to an asynchronous alternating-current load circuit, excitation apparatus for the electric valves of the system comprising a first auxiliary rectifier means provided with an inductive load circuit, a circuit for energizing said rectifier means at the frequency of said supply circuit, a second auxiliary rectifier means provided with an inductive load circuit, a circuit for energizing said second rectifier means at the frequency of said alternating-current load circuit, and a control circuit for each of said valves including components of alternating potential derived from the currents of each of said rectifier means.

4. In an electric valve converting system for transmitting energy from a polyphase alternating-current supply circuit to an asynchronous polyphase alternating-current supply circuit, excitation apparatus for the electric valves of the system comprising a first auxiliary polyphase rectifier energized from said supply circuit and provided with an inductive load circuit, a second auxiliary polyphase rectifier energized from said alternating-current load circuit and provided with an inductive load circuit, series transformers connected in the several phases of said auxiliary rectifiers, and a control circuit for each of said valves including a winding of a series transformer of each of said auxiliary rectifiers.

5. In an electric valve converting system for transmitting energy from an alternating-current supply circuit to an alternating-current motor, excitation apparatus for the electric valves of the system comprising a control circuit for each of the valves including a source of periodic control potential of the frequency of said supply circuit and a source of periodic control potential derived from the motor circuit, means for periodically and successively short circuiting the sources of supply frequency control potentials in the several control circuits to transfer the load current between the valves of the system, and means operative when said motor reaches a predetermined speed to render ineffective said short circuiting means.

6. In an electric valve converting system for transmitting energy from an alternating-current supply circuit to an alternating-current motor, excitation apparatus for the electric valves of the system comprising a control circuit for each of the valves including a source of periodic control potential of the frequency of said supply circuit and a source of periodic control potential derived from the motor circuit, and a distributor mechanism connected to be driven by said motor for successively short circuiting the sources of supply frequency control potentials in the several control circuits to transfer the load current between the valves of the system, said distributor including means for opening said short circuits when the motor reaches a predetermined speed.

7. In an electric valve converting system for transmitting energy from an alternating-current supply circuit to an alternating current motor, excitation apparatus for the electric valves of the system comprising a first auxiliary rectifier means provided with an inductive load circuit and energized from said supply circuit, a second auxiliary rectifier provided with an inductive load circuit and energized from the motor circuit, a control circuit for each of said valves including components of alternating potential derived from the currents of each of said rectifiers, and a distributor mechanism driven by said motor and effective to successively short circuit the components of alternating potential of supply frequency in the control circuits of said valves only when the speed of said motor is below a predetermined value.

8. In combination, an alternating-current supply circuit, an asynchronous alternating current load circuit, means including a plurality of electric valves interconnecting said circuits to transmit energy therebetween, a control circuit for each of said valves including a source of periodic control potential of the frequency of said supply circuit and a source of periodic control potential of the frequency of said load circuit, and means for converting said periodic potentials into potentials of rectangular wave form, the resultant of said potentials serving to render said valves conductive in a predetermined sequence.

9. In combination, an alternating-current supply circuit, an alternating-current motor, means for transmitting energy from said supply circuit to said load circuit including a plurality of electric valves, a control circuit for each of the valves including a source of periodic control potential of the frequency of said supply circuit and a source of periodic control potential derived from the motor circuit, and a distributor mechanism driven by said motor for successively short circuiting the sources of control potential of supply frequency in the several control circuits to transfer the load current between the valves of the system, said distributor including means for opening said short circuits when the motor reaches a predetermined speed.

10. In an electric valve converting system, a distributor mechanism for controlling the valves of the system comprising a plurality of stationary concentric annular contact segments insulated from one another, a rotating brush assembly mounted in operative relation to said contact segments and comprising a brush holder provided with a plurality of electrically connected brushes, each adapted to engage one of said stationary segments, said brushes being mounted in slots in said brush holder inclined radially outward, and a bias spring mounted in each of said slots, whereby said brushes engage their respective contact segments until the distributor reaches a speed at which the centrifugal force of said brushes exceeds the biasing force of the springs to disengage said brushes.

11. In an electric valve converting system, a distributor mechanism for controlling the valves of the system comprising two groups of stationary coaxial annular contact segments insulated from one another, the segments of each group being concentric and the segments of one group being angularly displaced with respect to those of the other group, a rotating brush assembly mounted between said groups of contact segments and comprising a conductive brush holder provided with a plurality of radially spaced brushes at each end, each of said brushes being arranged to engage one of said stationary segments and being mounted in a slot inclined radially outward, and a bias spring mounted in each of said slots, whereby said brushes engage their respective contact segments until the distributor reaches a speed at which the centrifugal force of said brushes exceeds the biasing force of the springs to disengage said brushes.

CAMIL A. SABBAH.